Nov. 1, 1927.

G. A. SAMOUCE

ANIMAL TRAP

Filed Nov. 12, 1926

INVENTOR
George A. Samouce
BY
ATTORNEY

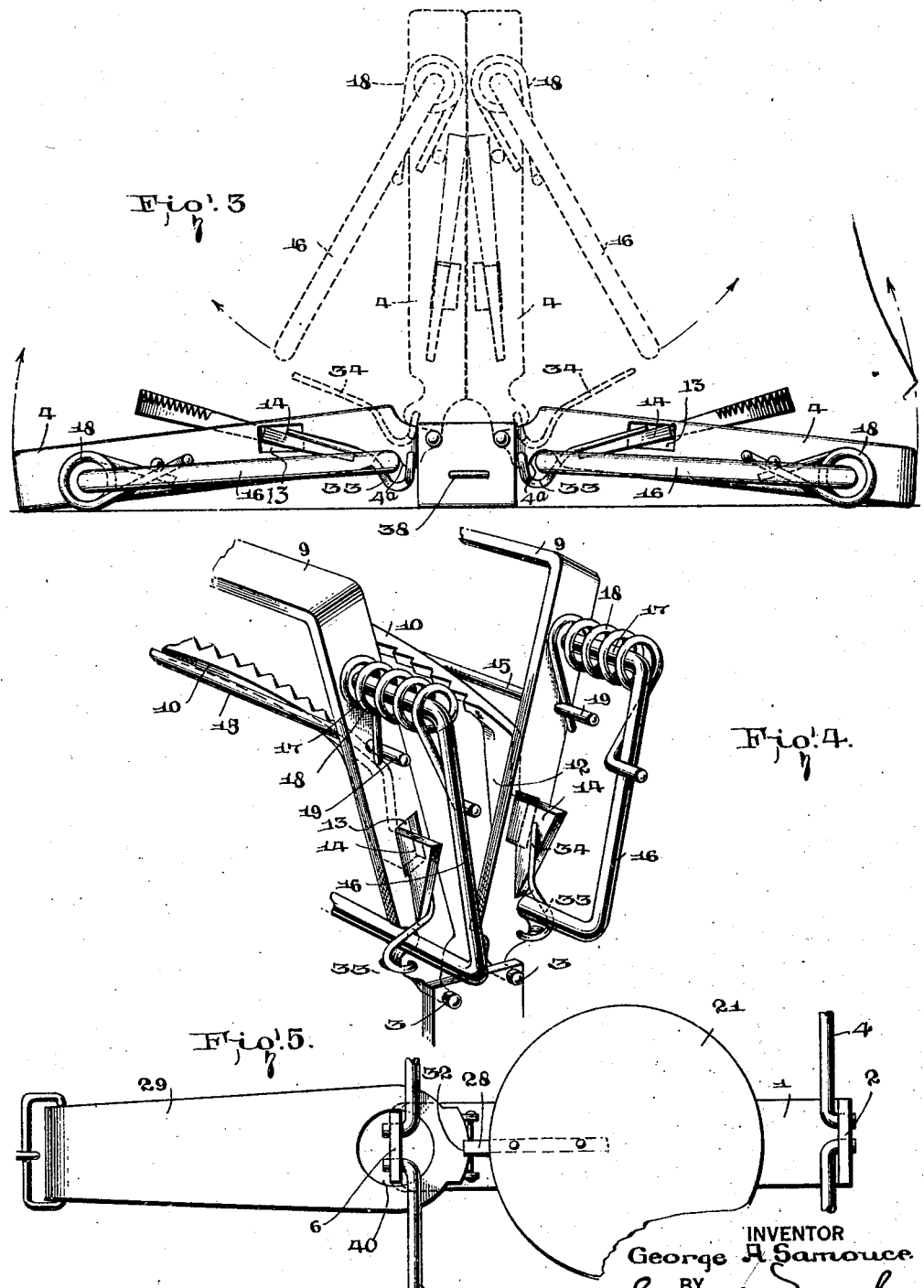

Patented Nov. 1, 1927.

1,647,416

UNITED STATES PATENT OFFICE.

GEORGE A. SAMOUCE, OF BROOKLYN, NEW YORK.

ANIMAL TRAP.

Application filed November 12, 1926. Serial No. 148,076.

This invention is an animal trap of the multiple jaw type, and is designed particularly to catch small animals, such as mink, musk-rat and the like and to kill them instantaneously.

The principal object of the invention is to provide a trap of relatively few parts, which is simple in construction and easy of manufacture, but which at the same time will positively catch and instantaneously kill animals of the character described.

To this end the trap consists generally of a suitable base upon which are mounted two pairs of jaws, together with actuating mechanism therefor, designed to cause the jaws to operate in sequence, the first set of jaws catching or entrapping the animal and the second set of jaws functioning to instantly kill the animal immediately after it is captured.

Another object of the invention is to provide a multiple jaw trap which will occupy a minimum of space when set, and to this end the several sets of jaws are arranged to overlie each other in set position in a manner such that when the trap is sprung the jaws will unfold in sequence to first catch and then kill an animal.

A still further object of the invention is to provide a trap of the type indicated, wherein the killing jaws will have a maximum range of movement, so as to more effectively kill the animal, and to this end the killing jaws are arranged to operate through an arcuate path of substantially 180°.

These and other objects will become apparent from the following description taken in connection with the accompanying drawings, by which I have chosen to illustrate one embodiment of my invention and wherein:

Fig. 3 is a side elevation of the trap in set position with dotted lines showing the relation of the parts immediately after the first pair of jaws has closed and the killing jaws have been released.

Fig. 4 is an enlarged detail perspective view of one of the combined jaw pivots and trigger mechanism just prior to being released.

Fig. 5 is a fragmental detail view of a modified form of my trap showing the use of a bent leaf actuating spring.

Figure 1:
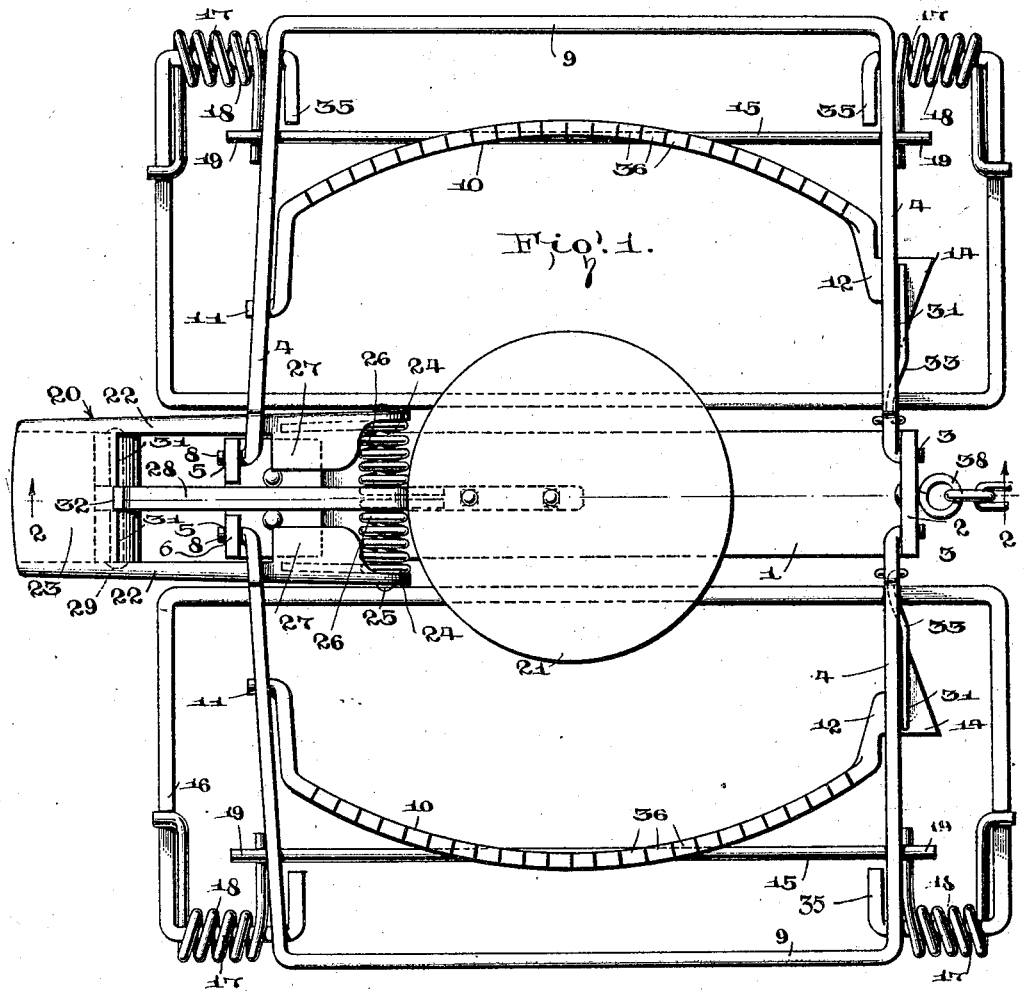
Fig. 1 is a plan view of a trap in set position.

Referring more in detail to the drawings wherein like reference numerals designate like parts throughout, the trap is shown as comprising a base plate 1 of any desired form, said plate having one extremity 2 thereof bent upwardly and apertured as at 3 to provide a pair of pivots or bearings in which to mount the jaw-frames 4, which will be referred to more particularly hereinafter. Intermediate its ends the base plate 1 is provided with cooperating jaw-frame pivots 5, carried in upstanding lugs 6, the lugs 6 being either stamped from the metal of the base plate 1 or formed as separate elements and secured to the base by suitable rivets 7.

The jaw-frames 4 are two in number and are mounted for cooperative pivotal movement upon the base 1 in the pivots 3 and 5 carried by the lugs 2 and 6, the jaw-frames for this purpose being provided with integral outturned pivot pins 8. As shown more clearly in Figs. 1 and 3, the jaw-frames 4 are substantially U-shaped in general outline, and are designed to provide a pivoted or swinging support for the jaw members constituting the catching and killing elements of the trap. To this end each of the said jaw-frames is provided intermediate its pivot and its outer extremity 9 with one member of a pair of primary or holding jaws 10—10. The jaw members 10—10 are mounted upon the jaw-frames 4 for limited pivotal movement with respect to the same. The holding jaws 10—10 are substantially arcuate in general outline and terminate in outstanding pivot pins 11 and 12, which pins engage appropriate pivot bearings provided in the jaw-frames. In this connection it is to be noted that the pivot bearings housing the pivots 11 are circular apertures designed to provide a snug turning fit for the pivot pins 11, while the apertures provided for the pivot pins 12 are narrow and substantially rectangular slots, as indicated at 13 in Figs. 3 and 4. The pivot pins 12 are shown extending through the slots 13 with their projecting portions flattened and cut to form substantially triangular outstanding ears 14, it being apparent that due to the flattened, non-circular form of the pivot pins 12, the jaw members 10 are capable of limited pivotal movement only, with respect to the jaw-frames, and said frames, in order to further restrict this pivotal movement, are provided with transverse stop rods 15 designed to be engaged by the under portions of the jaws 10 when the latter have been released, in a manner to be hereinafter fully described.

The killing jaws hereinbefore referred to, and indicated by the reference numerals 16—16, are designed for pivotal movement upon the outer extremities 9 of the jaw-frames 4. As shown in Fig. 1, the jaws 16 are substantially rectangular in form and somewhat wider than the frames upon which they are mounted, so that the inturned portions 17 thereof provide convenient means for supporting the actuating coil springs 18, said springs having their opposite extremities engaged with the jaws 16 and the extended ends 19 of the stop rods 15, in a manner such that the jaws 16, when released, are urged to rotate about their pivots in the direction indicated by the arrows in Fig. 3.

Figure 2:
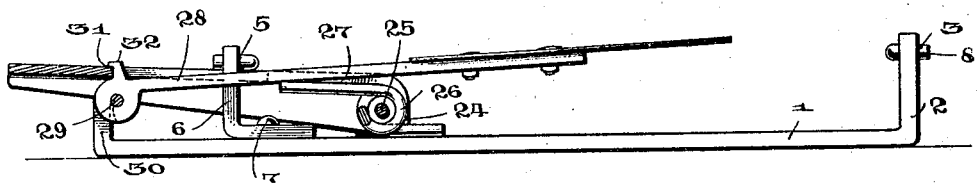
Fig. 2 is a sectional view taken on the line 2—2 of Fig. 1.

The main operating mechanism for the trap consists in a spring-actuated lever 20 and a trip or treadle 21. Referring particularly to Figs. 1 and 2, the lever 20 is shown comprising spaced side arms 22 connected at their outer ends by a bar 23 and mounted at their inner ends to the base plate 1, the base plate for this purpose being provided with spaced lateral upturned lugs 24 carrying pivot bearings, designed to receive a suitable pin or pintle 25, by which the lever 20 is pivotally secured to the base. The pin 25 also supports the lever actuating springs 26, which have their opposite extremities engaged under wing portions 27 of the arms 22, and the base 1, in a manner such that the tension of said springs urges the lever to move on the pin 25 in a clockwise direction. It is to be noted that the lever 20 is cut away centrally in order to span the jaw frame supporting lugs 6 and so that the lever 20 may underlie the leg portions of the jaw-frames adjacent to their pivotal connection to the base plate when the trap is set.

In order to maintain the lever 20 in a depressed position, resisting the force of the springs 26, the treadle 21 is provided with an extended arm 28 pivotally mounted to the base plate 1 by means of a pin 29, suitably journalled in an upstanding lug 30. The pin 29 is arranged to lie directly beneath the edge 31 of the bar 23 carried by the lever 20 when moved to the position shown in Fig. 2, and the lever arm 28 of the treadle 21 carries an undercut lip or trigger 32 designed to engage with the edge of said bar 23 in this position to secure the lever against movement by the springs 26.

To set the trap the jaw-members 16—16 are first set by being folded under the jaw-frames 4—4 against the tension of the springs 18—18, and are secured in this position by engagement of suitable link members 33, carried by the jaw-frames, with the protruding triangular extremities 14 of the pivot pins 12. As shown in Fig. 3, the jaw-frames 4 may be provided adjacent to the point of attachment thereto of the links 33, with recesses or cut-out portions 4$^a$, designed to receive the end cross bar of the jaws 16 when the trap is set, since by this means the trap as a whole is rendered more compact in set position. The links 33 are provided with substantially straight extended terminal portions 34, designed to engage the triangular extremities 14 of the jaw pivots 12 in a manner such that the jaw members 10 are maintained poised or slightly elevated with respect to the stop bars 15. This arrangement is clearly shown in Fig. 3.

The jaws 10 are now moved to set position, which comprises spreading the frames 4 apart and downwardly against the tension of the springs 26, the lever 20, by this operation, being depressed until in proximity to the trigger 32 of the treadle arm 28. These elements are then engaged as shown in Fig. 1, at which time the jaw-frames 4 will remain in a fully open position, due to the fact that all tension of the actuating springs 26 is restrained by the engagement between the lever 20 and the trigger 32. It will thus be seen that the trap when set as shown in Figs. 1 and 3, is extremely compact and occupies no greater space than the usual two-jaw jump-trap of No. 2 size.

The trap is released in the usual manner by an animal stepping upon or otherwise depressing the treadle 21. This action moves the trigger 32 clear of the bar 23, a sufficient space being provided between the arm 28 and the springs 26 to insure this action, whereby the lever 20 springs forcibly upward under the tension of the springs 26, carrying with it the jaw-frames 4, due to the engagement between the arms 22 of the lever and the leg portions of the jaw-frames. This swinging movement of the jaw-frames 4 about their pivots continues without interference until the jaw members 10 engage the foot, leg, body or other portion of the animal in the trap, at which time the jaw members 10 rotate slightly, about fifteen or twenty degrees, on their pivots to a position against the stop rods 15. This movement of the jaws 10 destroys the holding relation between the links 33 and the triangular extensions 14 of the jaws 10, due to the fact that the line contact between these elements is broken by the angular movement of said extensions and the links thus brought into engagement with the inclined edges of said extension. In this position and under the action of the springs 18 the links 33 slide rapidly off the extensions 14, thereby releasing the jaws 16, which forthwith spring through an arc of substantially 180° and impinge with killing force against the animal held between the jaws 10.

In order to prevent the jaws 16 swinging by one another, or telescoping within one another, the jaw pivots carry extensions 35, shown clearly in Fig. 1, which are designed to engage with the yokes or end bars 9 of the jaw-frames to limit the movement of each jaw 16 to substantially 180°.

The meeting edges of the jaws 10 may be serrated, as shown at 36, if desired, to enhance the gripping action of these members, while the confronting edges of the killing jaws 16 may be made of undulating or wavy formation.

The trap is preferably provided with the usual swivel ring and chain connection 38, shown attached to the lug 2 of the base for the purpose of securing the trap to the usual trap-stake.

Referring to Fig. 5 of the drawings, I have shown an arrangement whereby a large bent leaf spring 29 may be substituted for the spring actuated lever 20, described above, the spring 29 in this instance being secured to the base plate 1 and having its overlying extremity apertured as at 40, said aperture designed to receive the jaw frame supporting lugs 6 in a manner similar to that described in connection with the centrally cut-away portion of the lever 20. The inner end of the overlying portion of the spring 29 in this instance engages with the trigger 32 of the treadle arm 28 in an obvious manner, the spring 29 when released from the trigger, flying open to cause the jaw-frames 4 to move forcibly together.

It is to be noted that the trap as thus described, is simple in construction and positive in its operation, and that the trigger mechanisms thereof are arranged so that the catching or holding jaws must positively engage the animal (or each other) before the killing jaws are released from set position.

Furthermore, the trap is economical to manufacture, the major portions thereof being such that they may be stamped from sheet metal of suitable gauge and the remaining parts being formed from heavy gauge wire.

In conclusion, it is to be noted that while I have here chosen to illustrate and describe a preferred embodiment of my invention, such illustration and description are for the purposes of example only and not to define the limits of my invention, which are to be determined from the scope of the appended claims.

What is claimed is:—

1. An animal trap comprising a base, movable frame members mounted thereon, a relatively movable jaw member mounted upon each frame and movable therewith, actuating mechanism for the jaws and frames, and a trigger mechanism for controlling said actuating mechanism.

2. An animal trap comprising a base, movable frame members mounted thereon, cooperating jaw members mounted upon the frames and movable therewith, separate actuating mechanisms for the frames and a pair of jaws carried thereby, and trigger mechanism for controlling said actuating mechanisms.

3. An animal trap comprising a base, movable frame members mounted thereon, cooperating jaw members mounted upon said frame members and movable therewith, separate actuating mechanisms for the frames and a pair of jaws carried thereby, the frame actuating mechanism being mounted on the base, and the jaw actuating mechanism being carried by the movable frames.

4. An animal trap comprising a base, movable frame members mounted thereon, cooperating jaw members carried by said frames and movable therewith, separate actuating mechanism for the frames and a pair of jaws carried thereby, the jaw actuating mechanism being mounted for movement bodily with the frames.

5. An animal trap comprising a base, cooperative frame members mounted thereon for pivotal movement, spring means to move the frames together, a pair of jaw members mounted upon the frame members and movable therewith, spring means to actuate the jaws, trigger mechanism to maintain the jaws in a set position and means to actuate the trigger mechanism to release the jaw when the frames have moved together.

6. The trap described in claim 5, wherein said trigger actuating means includes a second pair of jaws mounted on the frames and capable of limited movement with respect thereto when the frames move together, said limited movement of the second pair of jaws functioning to release the trigger mechanism controlling the first mentioned jaws.

7. The trap described in claim 5, wherein a separate trigger mechanism is provided to control the action of the frames.

8. The trap described in claim 5, wherein the trigger mechanism controlling the jaw members includes control means dependent upon the prior operation of the frames.

9. An animal trap comprising a base, frames mounted thereon for cooperative pivotal movement, spring means to actuate the frames, control means for the frame actuating springs, a pair of jaws mounted on the frames, a second pair of jaws carried by the frames, spring means to actuate said second pair of jaws, and control means for the actuating means of the second pair of jaws, said first mentioned jaws being mounted for limited movement with respect to the frames under impact when the frames are actuated, and a mechanical connection between the adjacent members of the two pairs of jaws whereby the limited movement of the first mentioned jaws releases the second pair of jaws.

10. An animal trap comprising a base, frames movably mounted thereon, jaw members carried by the frames and cooperating to form two pairs of jaws, trigger mechanism associated with one pair of jaws and including means engageable with the other set of jaws whereby the release of the first mentioned jaws is rendered dependent upon prior release of the second mentioned jaws.

11. An animal trap comprising a base, frames mounted thereon for pivotal movements, control means for the frames adapted to releasably maintain the frames in a substantially horizontal set position, jaw members mounted on the upper or inner faces of the frames and cooperating to form one pair of jaws, other jaw members mounted on the frames and cooperating to form a second pair of jaws, spring actuating means associated with said second pair of jaws, trigger mechanism to maintain the members of the second pair of jaws folded under their respective frame members, said frame members, when released, being adapted to rise to a substantially vertical position to bring the first mentioned pair of jaws into operative engagement, and a mechanical connection between said first mentioned jaws and the second mentioned jaws to release said second mentioned jaws upon operative engagement of the first mentioned jaws.

12. An animal trap comprising a base, cooperative frame members pivotally mounted thereon, and jaw members movably mounted on said frames in spaced relation, the jaw members of each frame cooperating to form a plurality of pairs of jaws when the frames are moved together.

13. An animal trap comprising a base, cooperative frame members pivotally mounted thereon, jaw members pivotally mounted upon each frame, the several jaw members cooperating to form a plurality of pairs of jaws when the frames are brought together, and spring means to actuate the frames.

14. The trap described in claim 13, wherein each of the members of one pair of jaws is mounted for pivotal movement through an arc of substantially 180°.

15. The trap described in claim 13, wherein the members of one pair of jaws are capable of but limited pivotal movement only, and wherein a mechanical connection is provided between the corresponding members of two pairs of jaws, whereby the limited movement of the members of one pair of jaws releases the corresponding members of another pair of jaws for movement through an arc of substantially 180°.

16. In an animal trap including pivotally mounted frames carrying jaw members cooperating to form a plurality of pairs of jaws; spring means for actuating the members of one pair of jaws, and trigger mechanism to control said spring means, the trigger mechanism including links carried by the frames and engageable with the members of the spring actuated jaws and with extensions carried by the members of another pair of jaws, whereby to render the release of the spring-actuated jaws dependent upon the prior operative engagement of the members of said other pair of jaws.

17. An animal trap comprising a base, frame members mounted thereon, a jaw member mounted upon each frame member, means for actuating the jaws, and frames, and means for releasably maintaining the jaws and frames in set position in superposed relation with the frame members uppermost.

18. An animal trap comprising a base, frame members mounted thereon for pivotal movement, a jaw member pivotally mounted upon each frame member at a point remote from the pivotal connection of the frame to the base, means for actuating the frames and jaws, and means for releasably retaining the frame and jaws in set position with the frame members overlying their respective jaw members.

19. An animal trap comprising a base, frame members pivotally mounted thereon, a jaw member carried by each frame, means for actuating the jaws and frames, locking means for releasably maintaining the frames in a substantially horizontal set position with the jaw members folded thereunder, and locking means for releasably maintaining the jaws in such position, said last mentioned means including a trigger member lying above the plane of the frame members.

20. In a trap, the combination with a base member, of a frame member movably mounted thereon, a jaw member mounted upon the frame, means for actuating the frame and jaw, and locking means for releasably maintaining the frame and jaw in set position with the jaw member underlying the frame member.

21. In a trap, the combination with a base member, of a frame pivotally mounted thereon, a jaw member pivotally mounted upon the frame at a point remote from the pivotal connection of the frame to the base, means for actuating the frame and jaw, and locking means for releasably maintaining the frame and jaw in set position in superposed relation with the frame member uppermost.

22. The combination set forth in claim 21, wherein separate locking means are provided for the frame and jaw, the locking means for the jaw including a trigger member disposed above the plane of the frame in its set position.

In testimony whereof I hereunto affix my signature.

GEORGE A. SAMOUCE.